US005246331A

United States Patent [19]

Hallahan et al.

[11] Patent Number: 5,246,331

[45] Date of Patent: Sep. 21, 1993

[54] AIR FLOTATION ASSEMBLY TABLE

[75] Inventors: Michael A. Hallahan; Leroy F. Rearick, both of Butler, Pa.

[73] Assignee: Billco Manufacturing Inc., Zelienople, Pa.

[21] Appl. No.: 779,262

[22] Filed: Oct. 18, 1991

[51] Int. Cl.[5] ............................................. B65G 35/00

[52] U.S. Cl. ..................................... 414/676; 269/69; 269/305; 414/783

[58] Field of Search .................. 269/69, 70, 303, 305, 269/20; 466/87, 88; 414/676, 783; 198/434, 721, 379

[56] References Cited

U.S. PATENT DOCUMENTS

| | | | |
|---|---|---|---|
| 3,886,013 | 5/1975 | Bowser et al. | 156/109 |
| 3,990,570 | 11/1976 | Mercier et al. | 156/107 |
| 4,088,522 | 5/1978 | Mercier et al. | 156/107 |
| 4,145,237 | 3/1979 | Mercier et al. | 156/107 |
| 4,425,075 | 1/1984 | Quinn | 414/774 |
| 4,527,605 | 7/1985 | Ede et al. | 269/303 |
| 4,530,195 | 7/1985 | Leopold | 156/109 |
| 4,546,723 | 10/1985 | Leopold | 156/109 |
| 4,628,582 | 12/1986 | Leopold | 156/107 |
| 4,865,491 | 9/1989 | Sakurai | 406/87 |
| 5,054,991 | 10/1991 | Kato | 414/783 |
| 5,125,791 | 6/1992 | Volovich | 414/779 |

*Primary Examiner*—H. Grant Skaggs
*Attorney, Agent, or Firm*—George C. Atwell

[57] ABSTRACT

An air flotation assembly table utilized in the application of sealant strip material to the perimeter edges of sheet material, the assembly table having a flat work surface upon which the flat sheet material, such as a glass sheet, is placed for applying the sealant strip material to successive perimeter edges thereof. The flat work surface has a plurality of spaced-apart air holes through which air is emitted to float the sheet material slightly thereabove. In combination with the assembly table there is included a vacuum cup assembly for linearly positioning the sheet material so that an edge of the sheet material is presented to the workman, the vacuum cup assembly further including a vacuum cup for adhering to the sheet material, and a lift shaft for raising and lowering the vacuum cup. The vacuum cup assembly is mounted to a carriage which is selectively actuated for linear movement by a band cylinder. A plurality of detectors on the flat work surface are activated or deactivated by sheet material rotation, and the detectors interact with the vacuum cup assembly for positioning the sheet material on the table.

16 Claims, 11 Drawing Sheets

AIR FLOTATION ASSEMBLY TABLE

BACKGROUND OF THE INVENTION

The present invention pertains to apparatus for manipulating sheet material, and more particularly pertains to an assembly table for positioning and rotating thereupon glass sheet material so that a sealant strip material can be applied successively to all the perimeter edges of the sheet material.

A number of production steps are required in the manufacture of glass units for placement within window and door frames. Thermally insulative, single and multi-pane door and window units include a number of structural elements: wood, aluminum or vinyl frames to encase the glass window; metal spacers which are placed between the multi-pane glass window and along the peripheral edge thereof, the metal spacers sometimes being filled with a dessicant material to absorb moisture; muntin and mullion strips, commonly of wood, placed between and contiguous to each glass sheet of the multi-pane window for providing an ornamental appearance, and sealant strip material applied to the perimeter edges of each glass sheet of the multi-pane unit and in which the metal spacers are embedded.

Recent innovations in the manufacture of thermally insulative multi-pane windows include suspension of a polyester film coated with a heat insulative material between the panes of glass, and filling the space therebetween with a low conductivity gas, such as argon or krypton, which create a barrier to conductive heat transfer. The polyester film or films placed between the multi-pane window unit provides a barrier to radiative heat transfer through the window to the external environment.

It is well-known in the manufacture of single or multi-pane window units that the manner of treatment and construction of the perimeter edges is critical to the performance of the window. The manner in which the perimeter edges of the glass sheet are made can have a performance-degrading effect on the glass sheet when installed as an insulated door or window unit. The perimeter edge of the glass sheet can have a great impact on the overall thermal performance of the insulated window insofar as the center of the glass may register a high R value, yet the edges of the glass will be colder, especially during the winter, resulting in the formation of condensation between the glass sheets of the multi-pane window. This is partially due to the fact that the spacers placed at the edges of the glass sheets are predominantly made of metal which is an excellent heat conductor.

In addition, the thermal performance of the glass, whether installed as a single or multi-pane window unit, is effected by the manner in which the sealant strip material is applied to the perimeter edges thereof. Sealant strip material for application on the perimeter edges of the glass sheet comes in a number of substances, the most common being a polyisobutylene, or butyl hot melt, adhesive or a polymerizable plastic material injected by a nozzle placed adjacent the perimeter edges of the glass sheet. The sealant strip material is applied to the glass sheet to provide a hermetic barrier in the area where the frame fits around the perimeter edges of the glass sheet. Thus, moisture seepage and conductive heat loss are prevented by the airtight adhesion of the sealant strip material around the edges of the glass sheet. In a multi-pane window the sealant strip material is applied to the perimeter edges of each glass sheet to provide an air and watertight hermetic seal between the edges of both glass sheets and the window frame. The adhesive properties of the sealant strip material are designed to prevent fogging problems from developing due to a sealant strip leak, either between the sealant strip and the edge of either one or both of the glass sheets or between the sealant strip and the wood, aluminum or vinyl frame unit in which the multi-pane window is encased. When the hermetic adhesion of the sealant strip material fails, moisture in the air enters and condenses in the space between the glass panes, and fogging occurs. Thus, the quality of the multi-pane window is marred by the fogging occuring between the glass sheets, and, also, the heat insulative qualities of the multi-pane window are degraded by the sealant strip leak.

From the foregoing, it is obvious that the application of the sealant strip material is a critical element in the overall manufacture and thermal performance of any glass unit, whether a single pane or multi-pane glass window.

The prior art discloses a number of devices for applying a sealant strip material to the perimeter edges of glass sheet material. Some examples of the prior art are the Bowser et al. U.S. Pat. No. 3,886,113; the Mercier et al. U.S. Pat. No. 3,990,570; the Mercier et al. U.S. Pat. No. 4,088,522; the Mercier et al. U.S. Pat. No. 4,145,237; and the Leopold et al. U.S. Pat. No. 4,546,723.

Despite the ingenuity of the foregoing devices there is a need for an assembly table on which the application of sealant strip material to the perimeter edges of variously sized sheet material, primarily glass sheet material but not exclusively limited thereto, can be accomplished in a simple and efficient manner; avoiding systems employing extrusion nozzles, rollers upon which the sheet material longitudinally traverses, and various stations through which the glass sheet material must pass during the application process. Furthermore, there is a need for an assembly table on which sealant strip material can be applied to the edges of a glass sheet avoiding the problem of sealant strip material coating or soiling various mechanisms on the assembly table so that when the next glass sheet is placed thereupon, it is stained and soiled by sealant remnants deposited during application on the previous glass sheet.

Furthermore, there is a need for an assembly table which reduces worker movement to a minimum by successively presenting, parallel and adjacent to the workman, a perimeter edge of the glass sheet for applying sealant strip material thereto.

SUMMARY OF THE INVENTION

The apparatus of the present invention comprehends an air flotation assembly table utilized for applying a sealant strip material to the perimeter edges of sheet material, such as single and multi-pane glass sheet units, whereupon the sheet material is floated slightly above a flat work surface of the assembly table and the sealant strip material is quickly and efficiently applied to all the perimeter edges by a workman. The application of hermetic, thermal insulative sealant strip material to the edges of glass sheets is one step in the production of glass panes for utilization as windows placed within the framework of homes, buildings, and other structures. The air flotation assembly table is usually located in close proximity to other work stations so that the efficient movement and transportation of glass sheets from one work station to the next work station can occur with minimum interruption.

The air flotation assembly table of the present invention includes a table having a flat work surface whereupon the glass sheet is placed by the workman for applying the sealant strip material thereto. Enclosed by the table and located beneath the flat work surface is a plenum, manifold, or air chamber which receives pressurized air from an air blower mounted to a longitudinal table support frame member, the air blower positioned beneath the table. Pressurized air is distributed throughout the air chamber via tubing attached to the air blower and which is in flow communication with the air chamber. The flat work surface also includes a plurality of spaced air holes which allow passage therethrough of pressurized air from the air chamber in order to float the glass sheet slightly above the flat work surface.

The assembly table includes a longitudinal slot located on the flat work surface centered on the table and extending toward the work station side or table application side, the table application side being the side of the table where the workman stands while applying the sealant strip material to the glass sheet, and the table application side being the side where the control valves, knobs, and pushbuttons are located. In order to facilitate positioning of the glass sheet upon the flat work surface, grid lines substantially covering the flat work surface may be placed or formed thereon, and thus the workman can employ the grid lines to achieve precise positioning and repositioning of the glass sheet during the production process.

In the preferred embodiment of the present invention, a sheet positioning means is used in combination with the assembly table, the sheet positioning means including a carriage means for positioning the glass sheet so that a perimeter edge is always presented to the workman for applying the sealant strip material thereto. Among the structural elements included in the carriage means is a band cylinder mounted to a longitudinal table beam located beneath the flat work surface. The band cylinder is mounted parallel and adjacent the slot and includes a band cylinder carriage which is selectively activated by the band cylinder for reciprocal linear movement away from or toward the workman during the process of applying sealant strip material to each successive edge of the glass sheet. A right-angled braking track mounted to the table beam is located beneath the band cylinder and extends substantially the same length as the band cylinder and is parallel with the slot. A mounting plate is secured to the band cylinder carriage and extends downward to the right-angled braking track, and a brake is secured to the mounting plate. The brake traverses the braking track and is adapted for reciprocal linear movement thereupon in conjuction with the linear movement of the carriage.

The carriage means also includes a vacuum cup assembly secured to the mounting plate, and when the band cylinder actuates the carriage for reciprocal linear movement toward or away from the workmen, the vacuum cup assembly, along with the brake, moves simultaneously with the band cylinder carriage. The vacuum cup assembly includes a bearing block which is positioned immediately below the slot. The bearing block includes a bearing block bore vertically extending through the bearing block and concentrically located therein. Concentric to the bearing block bore and mounted within the bearing block is a one-way clutch bearing which restricts rotation to one direction. A lifting means comprising a lift shaft extends vertically through the bearing block bore and is adapted for slidable upward and downward movement therein. Further, the lift shaft is restricted to counterclockwise rotation by the one-way clutch bearing. A vacuum cup mounting block is mounted to the upper end of the lift shaft and is adapted to allow the egress of air therethrough. An index plate is subjacently mounted to the vacuum cup mounting block and has four index pin holes spaced 90° from each other located at its perimeter edge. In addition, four notches are formed on the perimeter edge of the index plate, each notch aligned with each respective spaced-apart index pin hole. Mounted to the bearing block is a spring-loaded index pin. The spring-loaded index pin rides upon the undersurface of the index plate and is adapted to register with each successive pin hole or to be retracted therefrom. Sheet adherence means to adhere to the undersurface of the glass sheet includes a vacuum cup mounted on the vacuum cup mounting block and is axially aligned within the slot and projects adjacent thereto. The vacuum cup is adapted for suction adherence to the glass sheet after being raised by the lift shaft, and suction release from the glass sheet prior to lowering by the lift shaft.

When the workman is rotating a glass sheet which is adhered to the vacuum cup so that a perimeter edge of the glass sheet will be presented to him, the vacuum cup, the index plate, and the lift shaft rotate, but only in a counterclockwise rotation due to the one-way clutch bearing. The spring-loaded index pin registers with one of the pin holes in order to lock the vacuum cup in place and prevent further rotation when an edge is presented parallel to the workman so that the sealant strip material can be applied thereto. After the workman has applied the sealant strip material to the edge parallel and facing him, the index pin is retracted from its registration with that respective pin hole by a retraction means, and thus the workman can rotate the glass sheet counterclockwise so that the next edge may be presented parallel to him for application of sealant strip material. The spring-loaded index pin rides upon the undersurface of the index plate until the next pin hole is axially aligned therewith, then the index pin registers with that respective pin hole thus locking the vacuum cup in place and preventing further rotation. Thus, the next edge of the glass sheet is presented parallel to the workman so that sealant strip material can be applied.

A sheet detecting means includes a plurality of spaced-apart and in-line detectors for positioning the glass sheet so that a perimeter edge of the glass sheet is presented to the workman for applying sealant strip material successively to each edge. The detectors are positioned within the flat work surface between the slot and the table application side and are interactive with the band cylinder. Depending on whether the detectors are activated or deactivated by the glass sheet when the glass sheet is rotated to bring the next edge parallel with the workman, output signals are generated to the band cylinder which actuates linear reciprocal movement of the band carriage, thus causing simultaneous movement of the vacuum cup assembly to or away from the workman.

Interactive with the band cylinder is a sensor. The sensor is mounted to the bearing block and aligned with the edge of the index plate. The sensor interacts with the index plate and the notches in order to determine when the index pin is locked into each respective pin hole and the vacuum cup and the index plate are not rotating, and also when the index pin is retracted therefrom and the vacuum cup and the index plate are being rotated by the workman so that the next edge may be presented to him. The sensor reads off the notches and signals the band cylinder so that the band cylinder can actuate linear reciprocal movement of the band carriage; such signaling occurring when the index pin has been retracted and the index plate and the vacuum cup are rotating due to the workman rotating the glass sheet.

The air flotation assembly table includes a means to initiate the raising of the lift shaft for adhering the vacuum cup to the glass sheet and also for initiating release and lowering of the vacuum cup from the glass sheet. A bar switch located adjacent the table application side and extending between the front two vertically-adjustable table legs actuates the index pin retraction from the index plate so that the workman can rotate the glass sheet. As a safety feature for the assembly table an all-stop button is provided adjacent the table application side whereby pressing the all-stop button electrically deactivates the sensor, the detectors, the band cylinder, and the interactions therebetween.

Raising or lowering the vacuum cup is accomplished by depressing a pair of footpads which are placed on the floor surface adjacent the table application side and generally also adjacent to the bar switch; more specifically, one footpad is designed to initiate raising of the lift shaft so that the vacuum cup can adhere to the glass sheet, and one footpad is adapted to initiate lowering of the lift shaft so that the vacuum cup can be released from the glass sheet.

A plurality of squaring pins may be optionally mounted to the table adjacent the table application side; in their operative position they project upwardly past the flat work surface. When the workman has applied sealant strip material to all the edges of the glass sheet he can release the vacuum cup whereupon the glass sheet is floating slightly above the flat work surface, and the workman can float the glass sheet to position the glass sheet against the squaring pins. The grid lines (also optional) on the flat work surface enable the workman to place vertical support members, such as a mullion strip, on the glass sheet and then a second glass sheet may be placed superjacent to the glass sheet already squared against the squaring pins. Thus, the second glass sheet sandwiches the mullion strip and is perfectly aligned with what would be the lower glass sheet as they are both squared to each other and butted against the projecting squaring pins. A wear strip is also provided at the table application side adjacent to the workman. When the workman is applying the sealant strip material to an edge of a glass sheet presented parallel to him, the sealant strip material is fed through a hand-held applicator which has rollers or casters for rolling upon the wear strip. The workman holds the hand applicator adjacent to the edge of the glass sheet, and as the sealant strip material is fed through the hand applicator from a nearby unreeler, the sealant strip material is pressed against the perimeter edge of the glass sheet. Because the hand applicator continuously contacts the flat work surface as it applies the sealant strip material to the edge, that portion of the flat work surface tends to be worn down over time. The wear strip provides a durable surface upon which the hand applicator can contact and thus provides a longer lasting, abrasion resistant surface.

It is an objective of the air flotation assembly table to provide an easy means of positioning and centering the glass sheet upon the vacuum cup by floating the glass sheet above the vacuum cup, centering the glass sheet thereabove, and then initiating vacuum cup adherence to the glass sheet.

Another objective of the air flotation assembly table is to provide, by the sheet positioning means, which includes the carriage means and the sheet detecting means, the ability to continuously present a perimeter edge of the glass sheet parallel to the workman so that the sealant strip material can be quickly and efficiently applied thereto.

Yet another objective of the assembly table is to provide means for squaring and aligning two or more glass sheets on the flat work surface as part of the process of making a multi-pane glass unit.

Other features and advantages of the invention will become apparent from the following detailed description of the invention made with reference to the accompanying drawings which form part of the specification.

DETAILED DESCRIPTION OF THE PREFERRED EMBODIMENT

Figure 1:
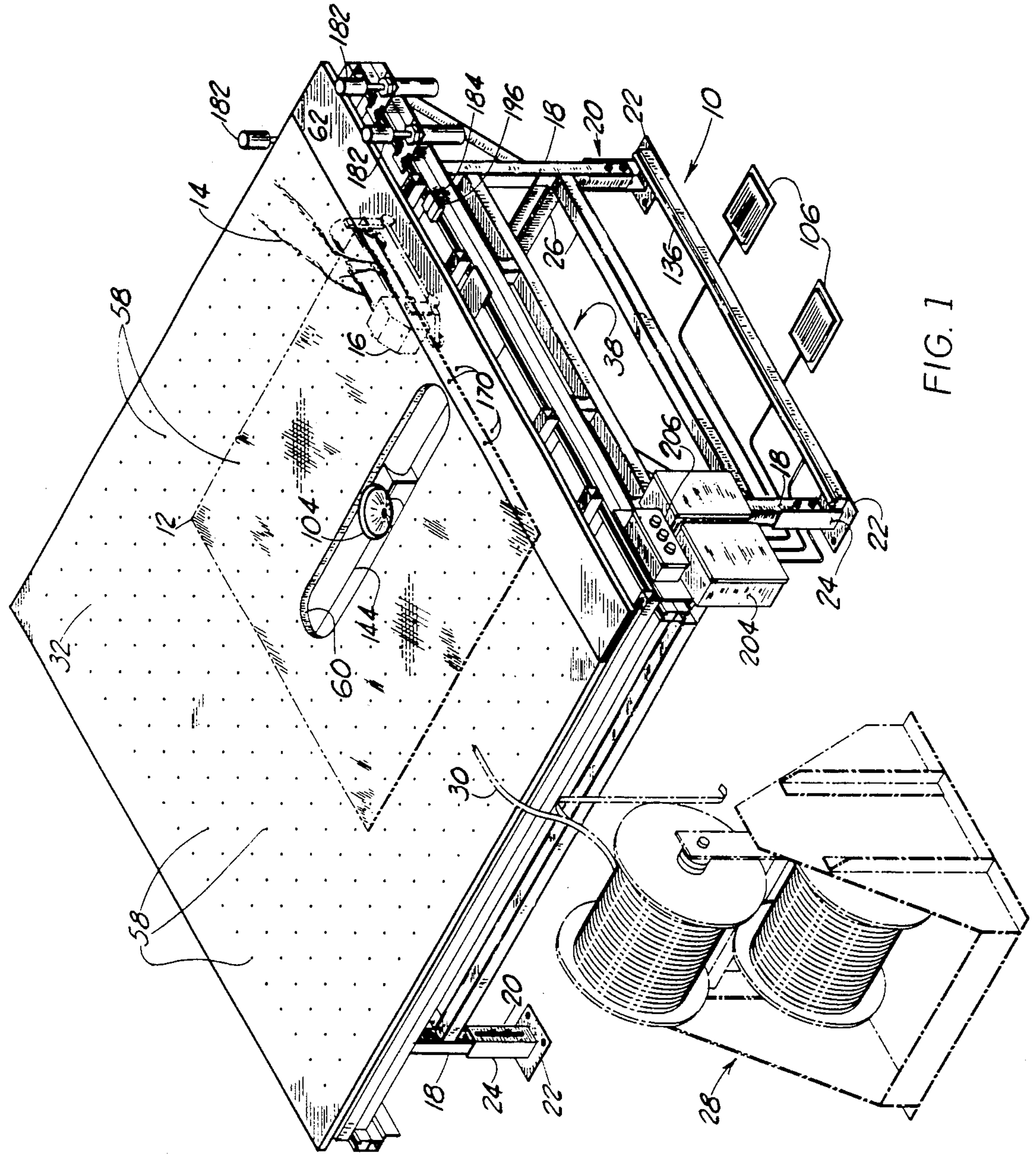
FIG. 1 is an isometric view of the preferred embodiment of the air flotation assembly table of the present invention.

FIGS. 1 through 4 illustrate an air flotation assembly table 10 which is utilized for positioning and rotating thereupon flat sheet material, such as variously sized and shaped glass sheets used in single and multi-pane insulative windows, so that sealant strip material can be successively applied to each perimeter edge of a glass sheet 12. In the preferred embodiment of the table 10, a sheet positioning means is used in combination therewith to allow the workman to quickly and efficiently rotate the glass sheet 12 so that a perimeter edge of the glass sheet 12 is always presented parallel and adjacent to the workman 14 (only a hand is shown) for applying the sealant strip material by a hand-held applicator 16. This minimizes the stretching, bending, and repositioning that would be required of the workman 14 if a perimeter edge were not continuously presented to the workman for applying the sealant strip material thereto. The assembly table can be variously sized to accommodate different sizes of glass sheet.

Figure 3:
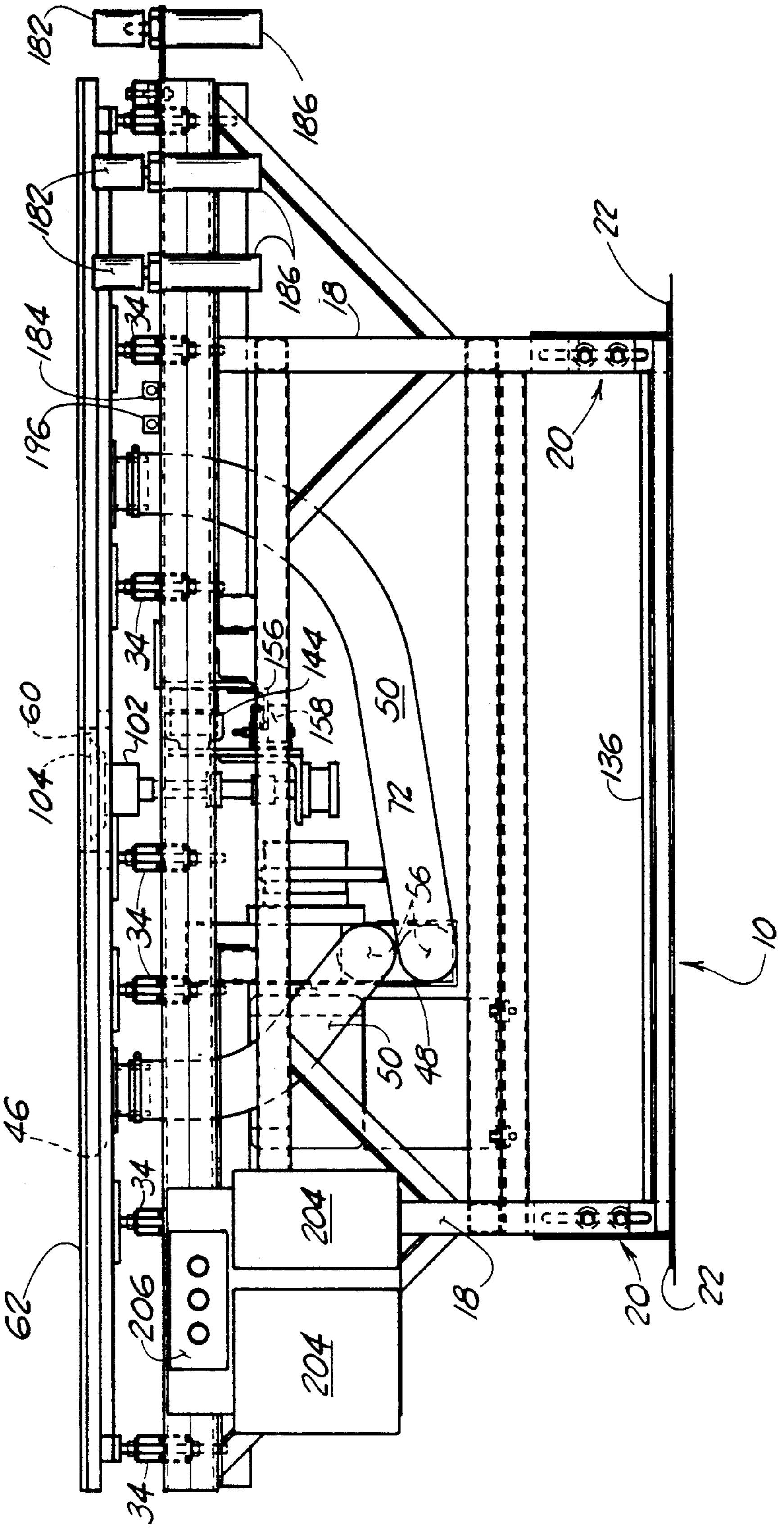
FIG. 3 is a front elevational view of the table taken along line 3—3 shown in FIG. 2.
Figure 4:
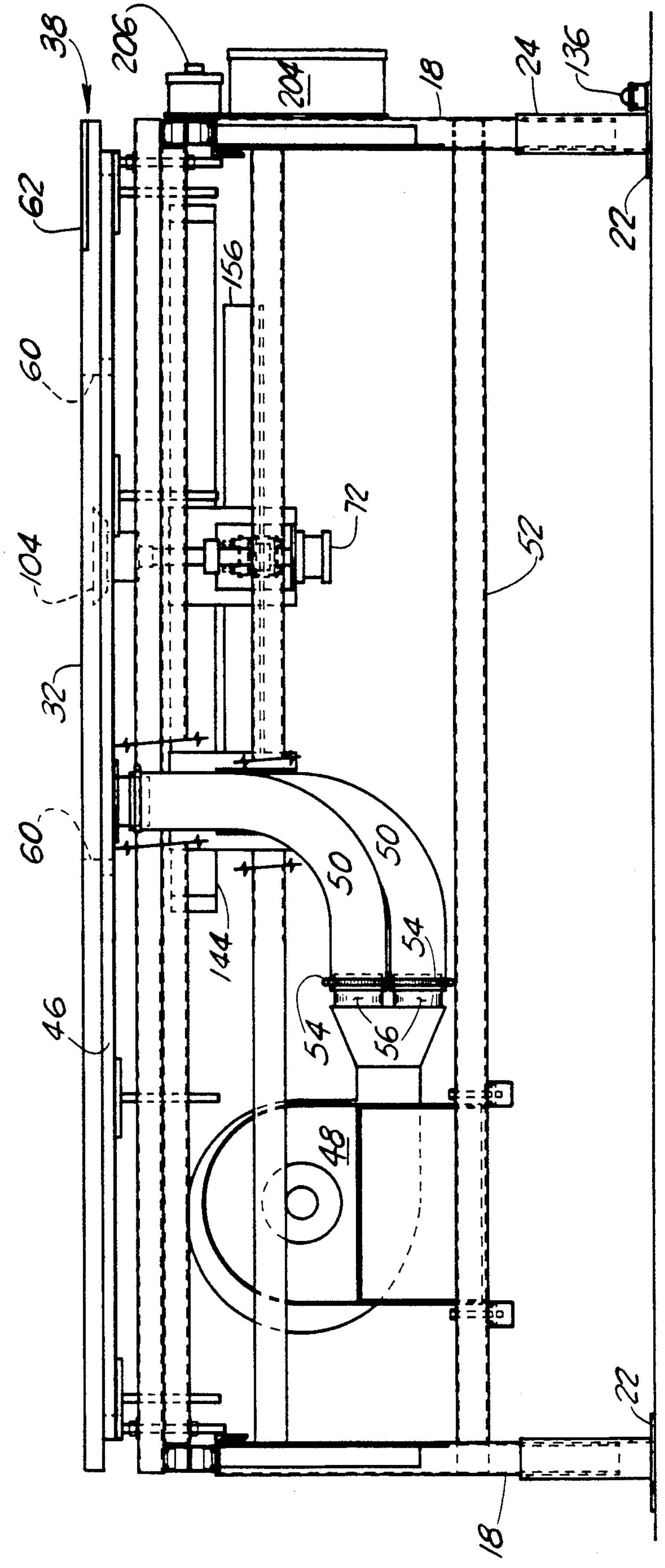
FIG. 4 is a side elevational view of the table taken along line 4—4 of FIG. 2.

The assembly table 10 includes, as shown in FIGS. 1, 3, and 4, four vertically-extending, adjustable legs 18. Each upright leg 18 rests upon, and is contiguously situated within, an adjustment member 20 which includes a flat plate 22 and an upright, vertical, right-angled bracket member 24. Loosening the bolts that extend through each leg 18 and into the right-angled bracket member 24 permits the height of the table 10 to be adjusted. When the correct height for maximum worker comfort and efficiency is attained, the bolts are then tightened, fixing the height of the table 10. To further reinforce the table 10, a plurality of table support frame members 26 are attached to, and horizontally extend between, each separate upright leg 18.

Situated to one side of the air assembly table 10 is a stand, referred to as an unreeler 28. The unreeler 28 includes two large spools which contain the coils of sealant material 30. The sealant strip material 30, which is also called swiggle strip, is threaded through the hand-held applicator 16, and the applicator 16 is moved from the right-hand side to the left-hand side by the workman 14 along the perimeter edge of the glass sheet 12 that is presented to the workman 14. As the workman 14 rolls or slides the applicator 16, a length of the sealant strip material 30 is pressed tightly against the perimeter edge for adhesive contact thereto. This process will be more fully described hereinafter.

Figure 6:
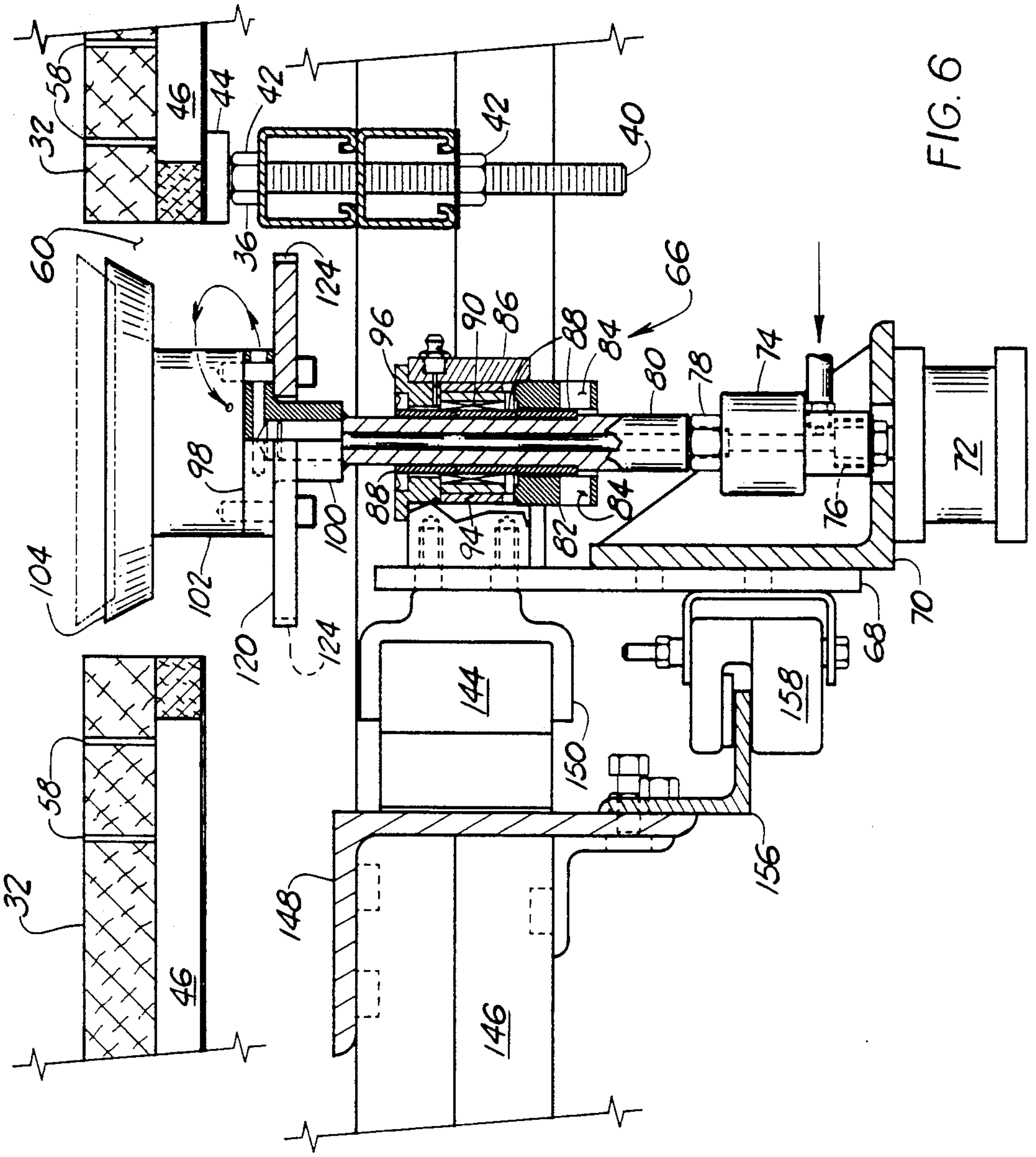
FIG. 6 is a cross-sectioned elevational view of the table taken along line 6—6 of FIG. 2.
Figure 7:
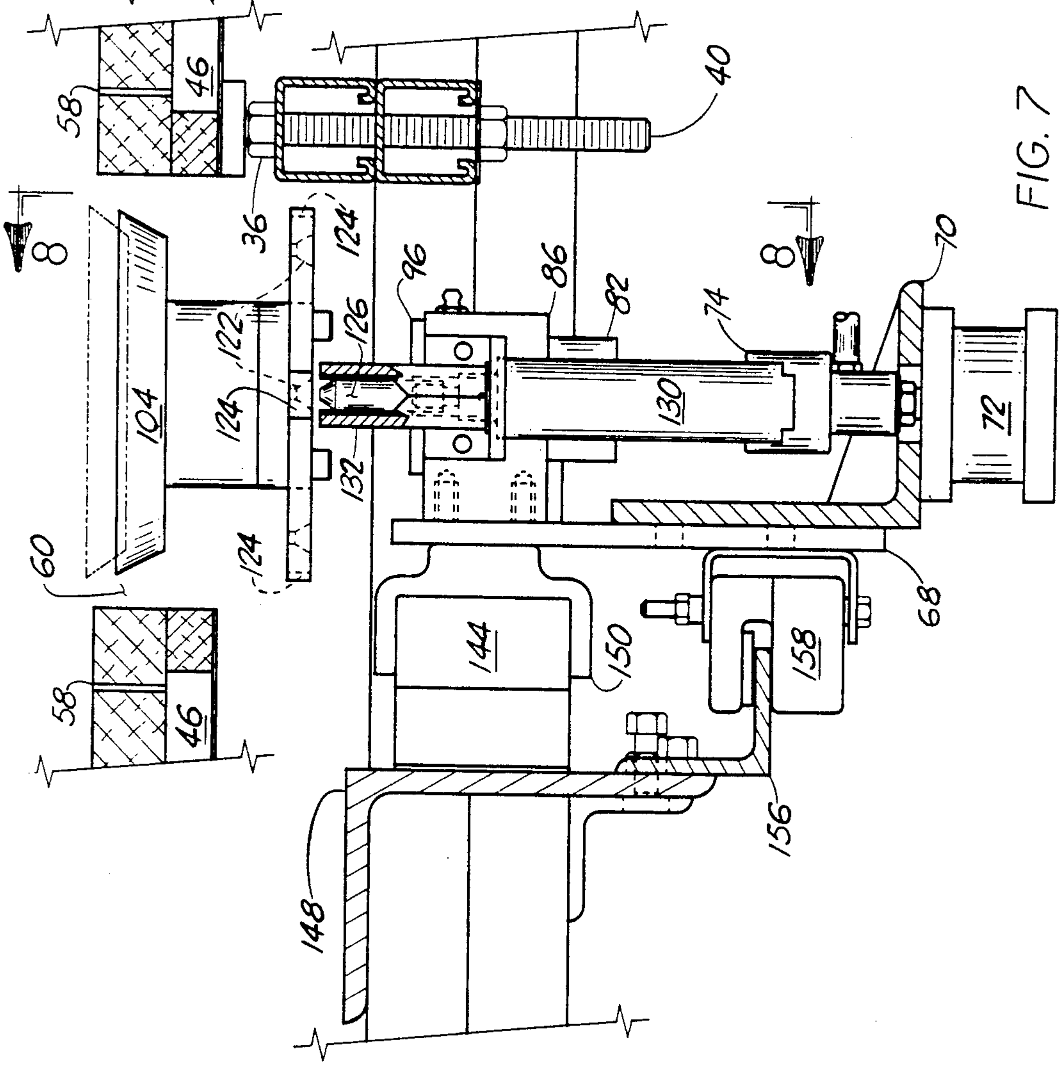
FIG. 7 is an enlarged fragmentary elevational view of the table taken along line 7—7 of FIG. 2.

As shown in FIGS. 1 through 4, the assembly table 10 includes a flat work surface 32 whereupon the glass sheet 12 is placed. More particularly, the flat work surface 32 is spaced from the main body of the table 10 by a plurality of spaced-apart table support beams 34 illustrated in FIGS. 3, 6, and 7. An adjustment means for the table 10 is shown in FIGS. 3, 6, and 7 and includes a plurality of spaced-apart individually-adjustable levelers 36 positioned subjacent the table 10. The table 10 is further defined by having what may be called a work station side or table application side 38 which is the area where the workman 14 is positioned while applying the sealant strip material 30 to the perimeter edge of the glass sheet 12 and each spaced-apart table support beam 34 extends lengthwise from the table application side 38 to the rear of the assembly table 10. The individually-adjustable levelers 36, referred to previously and best shown in FIGS. 6 and 7, include a threaded pin or bolt 40, at least two nuts 42 (one of which is a jam nut), and a leveling support member 44 mounted subjacent to the table 10. By tightening and loosening the nuts 42, the bolt 40 can be adjusted upward or downward and the height of the table 10 can also be adjusted. In addition, if the flat work surface 32 exhibits warpage in certain areas, levelers 36 in that particular area can be adjusted to compensate for the warpage.

The table 10 is further defined by having a manifold, plenum, or air chamber 46, as shown in FIGS. 5, 6, 7, and 9. The air chamber 46 extends beneath the flat work surface 32 and receives pressurized air from a blower means such as an electric air blower 48. A typical electric blower may include a one-horsepower motor operating at 3,600 rpm's and on a current of 12 amps. At least two pieces of flexible, elongated tubing 50 extend from the electric blower 48 to the left-hand and right-hand underside of the table 10. The blower 48 is mounted on a table support frame member 53 extending beneath the table 10. Thus, the tubing 50 is in air flow communication with the electric blower 48 and the air chamber 46. Hose couplings 54 on each piece of tubing 50 secure each respective tubing 50 to a blower outlet 56 on the electric blower 48 as shown in FIGS. 3 and 4.

Figure 2:
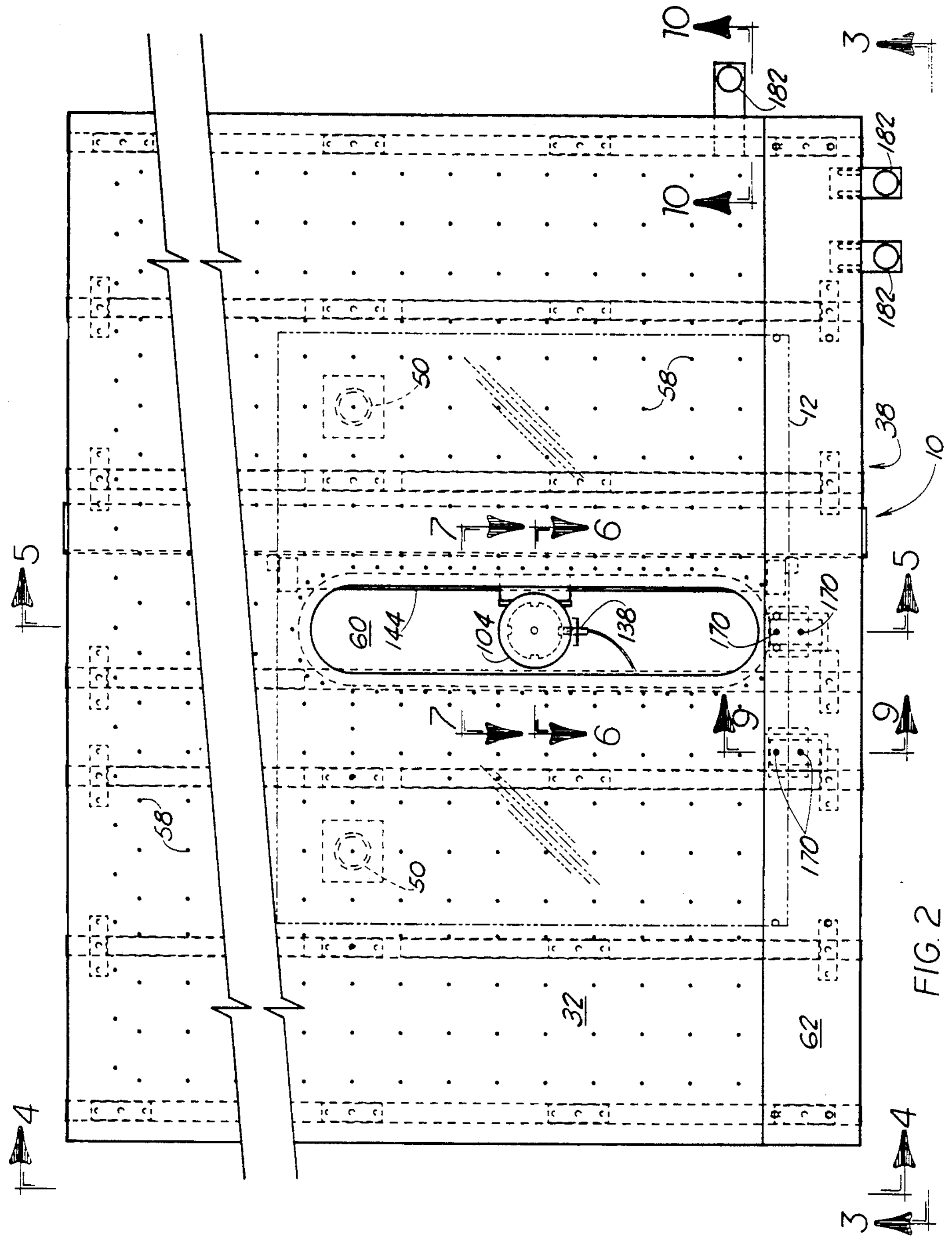
FIG. 2 is a top plane view of the assembly table first shown in FIG. 1.

As illustrated in FIGS. 1 and 2, the flat work surface 32 includes a plurality of equidistantly-spaced air holes 58 substantially covering the flat work surface 32. The air holes 58 allow passage therethrough of pressurized air which is generated by the blower means and distributed through each respective tubing 50 into the air chamber 46. When the assembly table 10 is in its operative state, pressurized air quickly fills the chamber 46 in an even distribution throughout whereupon it is forced through the air holes 58. The pressurized air imparts a floating action to float the glass sheet 12 above the flat work surface 32 from 1/32-inch to 1/64-inch thereabove so that the glass sheet 12 can be correctly positioned on the flat work surface 32.

Cut out from and centered on the flat work surface 32 is a longitudinal slot 60, shown in FIGS. 1, 2, 5, 6, 7, 12, and 13, which extends generally from the center of the table 10 toward the table application side 38. The slot 60 is perpendicular to the table application side 38 and the length of the slot 60 can be varied to make the slot 60 commensurate with the dimensions of the table 10. Adjacent the table application side 38, in front of the slot 60 and extending the width of the table 10, is a wear strip 62 (FIGS. 1, 2, 4, and 5). The wear strip 62 is the area contacted or engaged by the hand applicator 16 as the workman 14 applies the sealant material 30 to the glass sheet 12, and, therefore, the wear strip 62 is made of a resiliant material to resist abrasion due to the constant back-and forth movement of the hand applicator 16 as sealant material 30 is applied to the perimeter edge of the glass sheet 12. It was found that, over time, this part of the flat work surface 32 would be worn down with furrows and grooves due to the constant back-and-forth motion of the hand applicator 16, and, therefore, the wear strip 62 is provided to resist abrasion and also to increase the longevity of the table 10. In addition, the wear strip 62 can be removed and replaced should that be necessary.

Figure 11:
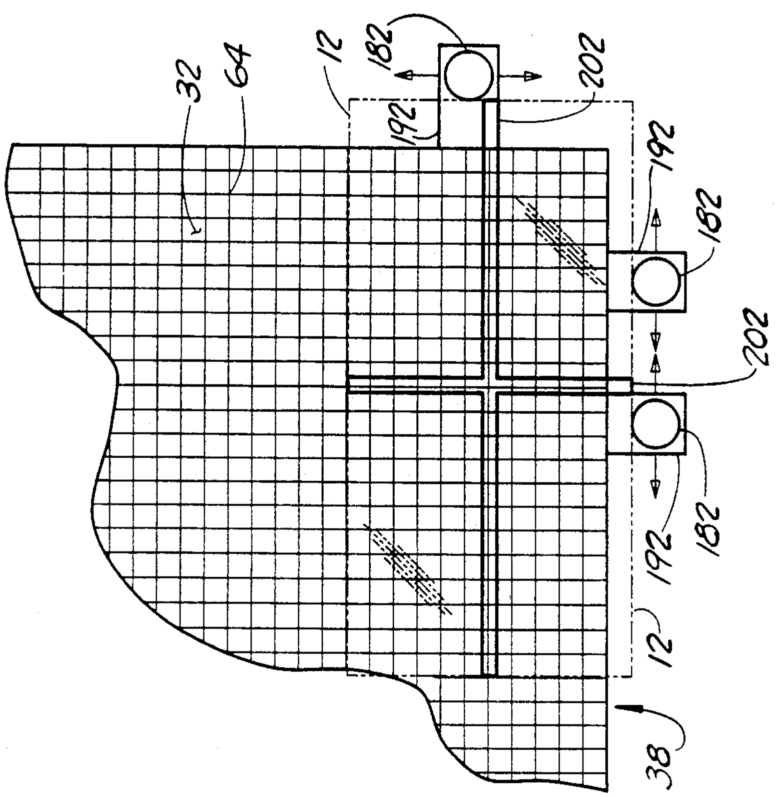
FIG. 11 is an enlarged fragmentary view of the table first shown in FIG. 1, with the grid lines placed on the flat work surface of the table.

The assembly table 10 may also include a plurality of grid lines 64 formed or placed upon the flat work surface 32, as illustrated in FIG. 11. FIG. 11 shows grid lines 64 covering a fragment of the flat work surface 32 of the right-hand side of the table 10 adjacent the table application side 38, but the grid lines 64 would cover the entire flat work surface 32 of the table 10 of FIG. 1. Their use will be further described hereinafter.

Figure 8:
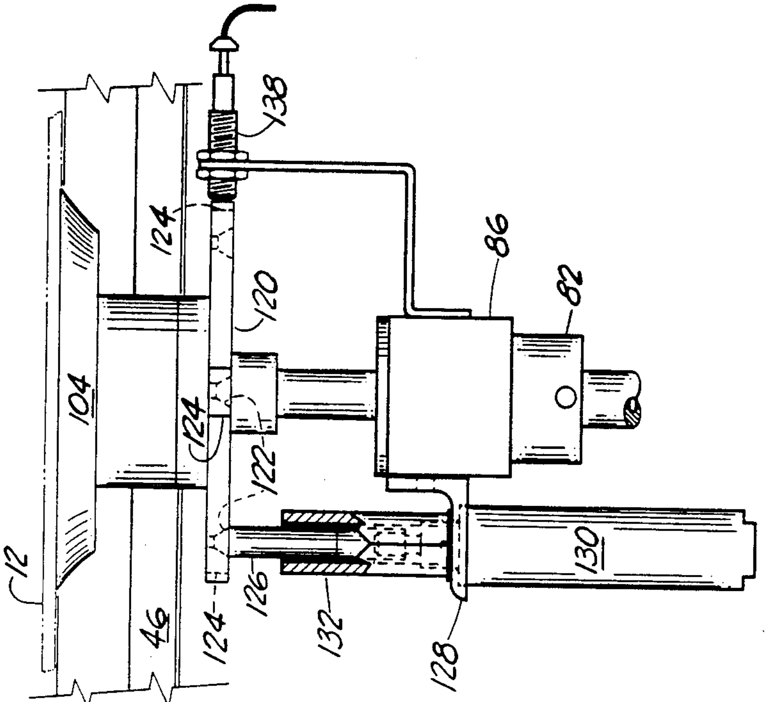
FIG. 8 is an enlarged fragmentary view of the table first shown in FIG. 1.

The sheet positioning means presents successive perimeter edges of the glass sheet 12 parallel and adjacent to the workman for applying the sealant material 30 thereto and includes a carriage means for centering and positioning the glass sheet 12. The carriage means includes a vacuum cup assembly 66 whose elements shall now be described. As illustrated in FIGS. 6 through 8, the vacuum cup assembly 66 includes a flat, generally square-shaped, vertically-extending mounting plate 68. A right-angled, shaft mounting bracket 70 is secured to the lower portion of the mounting plate 68. A selectively actuated air cylinder 72 is mounted subjacent to the horizontal portion of the shaft mounting bracket 70 and has contained within it a piston (not shown) which raises or lowers structural elements which will be hereinafter described and which are also part of the vacuum cup assembly 66. A rotating pressure joint 74 is mounted superjacent to the horizontal portion of the shaft mounting bracket 70. The rotating pressure joint 74 has a threaded insert 76 which allows connection to the shaft mounting bracket 70. An intermediate internally-threaded nut 78 is located immediately above the rotating pressure joint 74. Threadably secured to the intermediate nut 74 is a lifting means. The lifting means includes a rotatable lift shaft 80 which can be actuated for slidable upward movement toward the slot 60 or slidable downward movement away from the slot 60. The pressure joint 74 has an internal bore which registers with a central bore of the lift shaft 80, both of which allow the passage of air therethrough.

An adjustment nut 82 is mounted to the lift shaft 80 at the middle portion of the lift shaft 80 and encompasses the lift shaft 80. The adjustment nut 82 is used to control the amount of back-slip for the lift shaft 80. If more tension (less back-slip) is required, the nut 82 is tightened; if less tension (more backslip) is required, the nut 82 is loosened. The nut 82 is turned inward for more resistance or opposite for less resistance. This is accomplished by inserting an appropriately-sized ratchet or bar into two oppositely-disposed outwardly-opening lateral bores 84. The nut 82 is threadably secured into a bearing block 86, and the bearing block 86 is mounted to the upper portion of the mounting plate 70.

The bearing block 86 has a vertically-extending bearing block bore which encompasses the lift shaft 80 and within which the lift shaft 80 slidably upwardly or downwardly moves. Affixed to and encompassing the lift shaft 80, are a plurality of bearing races or cylindrical spacers 88 stacked atop each other. A one-way clutch bearing 90 is located concentric to the bearing block bore contiguous to the races 88. When the lift shaft 80 is actuated for slidable upward movement toward the glass sheet 12 or slidable downward movement away from the glass sheet 12, the races 88 ride against the one-way clutch bearing 90. More specifically, each race 88 has an outer bearing surface which contiguously rides against the clutch bearing 90 during such movement. The outer bearing surface of each race 88 also rides against the one-way clutch bearing 90 when the lift shaft 80 is rotating. Furthermore, only one-way, counterclockwise, rotation of the lift shaft 80 is allowed as the clutch bearing 90 resistively engages the races 88 to prevent clockwise rotation of the lift shaft 80. Several other structural elements which are concentric with the lift shaft 80 and found within the bearing block 86 are a sleeve 92, which is placed circumjacent to the clutch bearing 90, and a friction ring 94, which is circumjacent and contiguous to the sleeve 92. As illustrated in the cross-sectioned elevational view of FIG. 6, the aforementioned structural elements interfit one to the other. A bearing block cap 96 is mounted atop the bearing block 86 and also includes a cap bore which is concentric with the bearing block bore and through which the upper portion of the lift shaft 80 projects. As shown in FIGS. 6, 7, and 8, a cylindrical lift shaft flange or plate 98 has a downwardly-projecting tubular member 100 which is welded to the uppermost portion or end of the lift shaft 80 and is concentrically aligned thereto. The plate 98 and tubular member 100 permit airflow therethrough. Mounted to the plate 98 is a vacuum cup valve block or mounting block 102 which allows ingress and egress of air therethrough. As shown in FIGS. 1, 2, 5, 6, 7, and 8, a sheet adherence means includes a vacuum cup 104 mounted to the vacuum cup mounting block 102, and the vacuum cup 104 is axially aligned within the slot 60 and projects adjacent and slightly above the slot 60 when it adheres to the glass sheet 12 placed on the flat work surface 32. As shown in FIG. 8, the vacuum cup 104 is utilized for suction adherence to the undersurface of the glass sheet 12 after being raised by the lift shaft 80 and suction release from the glass sheet 12 prior to lowering by the lift shaft 80. In addition, the vacuum cup 104 is rotatable as a consequence of the rotation of the lift shaft 80.

A means to initiate raising and lowering of the vacuum cup 104 is shown in FIG. 1 and includes a pair of footpads 106 to actuate the raising and lowering of the lift shaft 80 to cause suction adherence or suction release of the vacuum cup 104 to the glass sheet 12.

Figure 14:
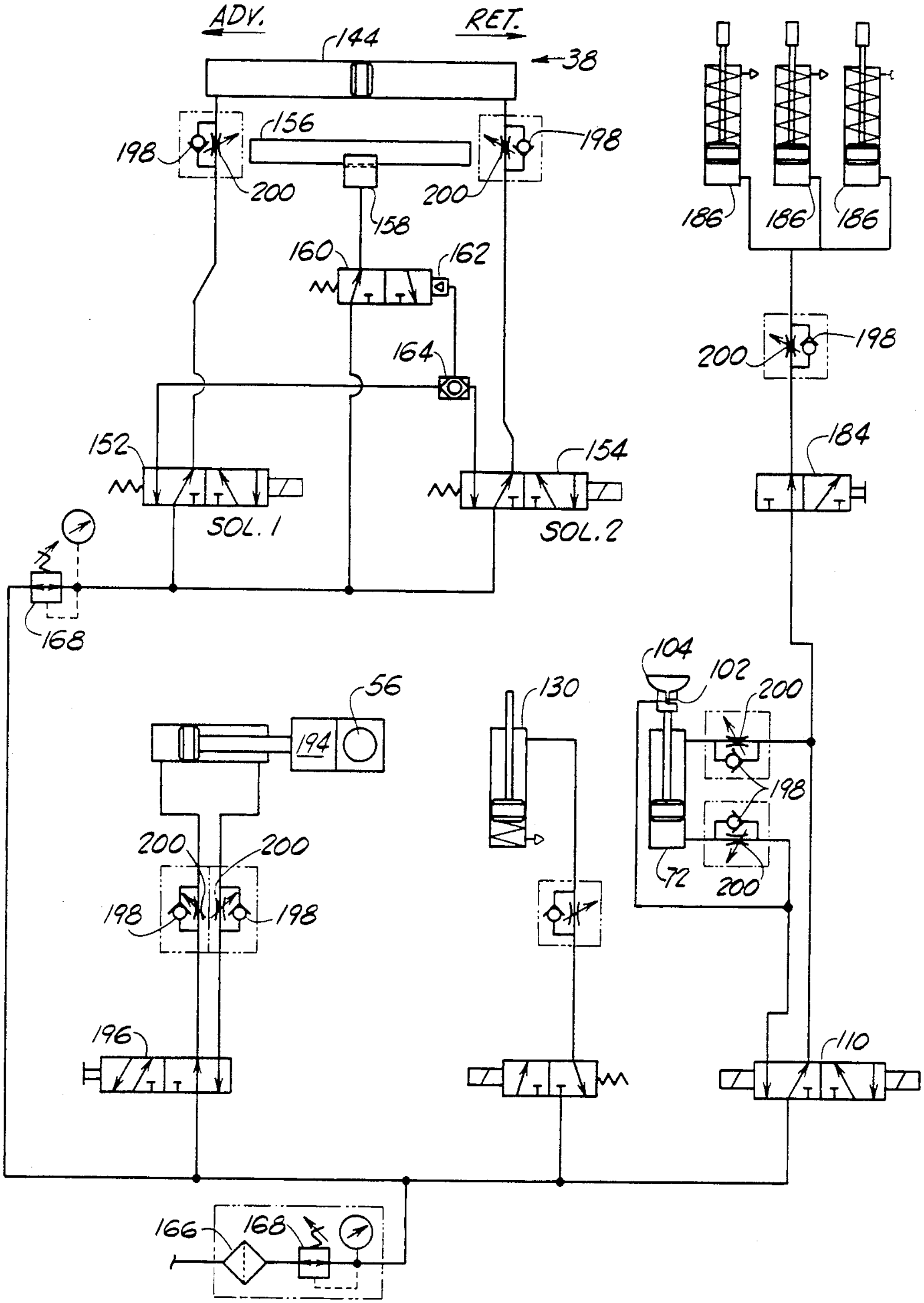
FIG. 14 is a pneumatic schematic for the table first shown in FIG. 1.
Figure 15:
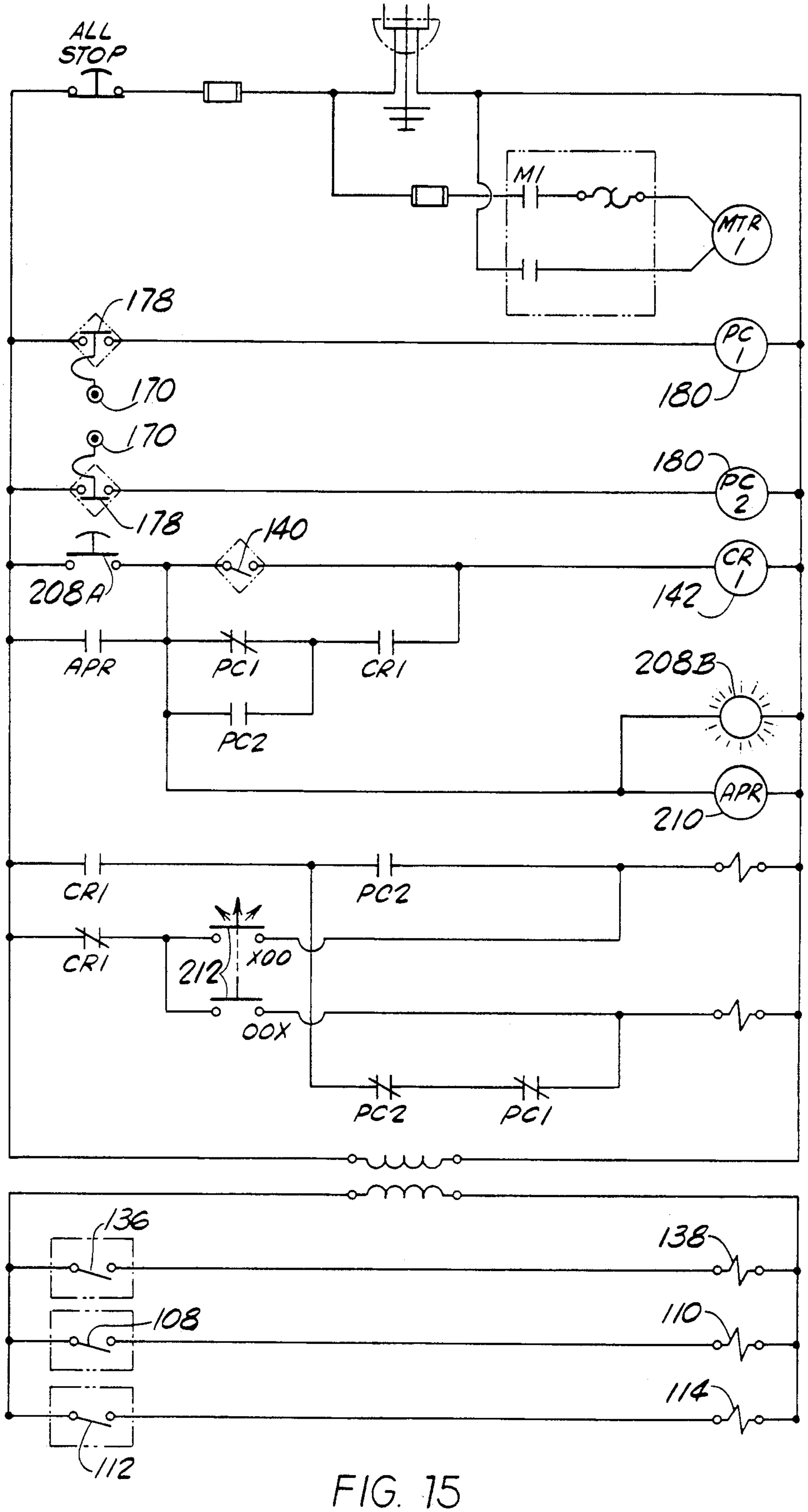
FIG. 15 is an electrical schematic for the table first shown in FIG. 1.

As illustrated in FIGS. 14 and 15, in order to raise the vacuum cup 104 for suction adherence to the glass sheet 12, one footpad 106 (as shown in FIG. 1) is stepped on or depressed, closing a switch 108 and electrically energizing a three-position solenoid valve 110 which allows air into the line to actuate the piston contained within the vacuum cup assembly 66 and which was described earlier. The air actuated piston raises the lift shaft 80 and causes the vacuum cup 104 to be raised up and adhered to the glass sheet 12 which has already been placed on the flat work surface 32. In order to lower the vacuum cup 104 and release it from suction adherence to the glass sheet 12, the other footpad 106 would be stepped on and depressed, closing an associated switch 112 and electrically energizing the three-position solenoid valve 114 to move in the opposite direction, as shown in FIG. 14. Thus, air is evacuated from the line and the vacuum cup 104 is released from adherence to the glass sheet 12. A pair of associated check valves 116 and flow control valves 118 regulate the intake and evacuation of air during the raising or lowering of the vacuum cup 104.

The carriage means also includes, as illustrated in FIGS. 5 through 8, a flat circular index plate 120 subjacently mounted to the vacuum cup mounting block 102. The index plate 120 has substantially the same diameter as the vacuum cup 104, and simultaneous with the vacuum cup 104, the index plate 120 is moved upward or downward, or rotates, as a result of the upward, downward, or rotational movement of the lift shaft 80. In addition, because the index plate 120 is indirectly mounted to the lift shaft 80, the index plate 120 is also restricted to counterclockwise rotation during rotation of the vacuum cup 104 and the lift shaft 80. Located at the perimeter edge of the index plate 120 are four spaced-apart index pin holes 122, the index pin holes 122 being spaced 90° from each other. Formed, incised, or milled out on the perimeter edge of the index plate 120 are four outwardly-open notches 124. The outwardly-open notches 124 are spaced 90° from each other and are adjacent and aligned with each respective pin hole 122.

As shown in FIGS. 7 and 8, another structural element of the carriage means is a selectively retractable and extendable spring-loaded index or lock pin 126 which is mounted to the bearing block 86 and, as utilized in the apparatus of the present invention, is selectively air actuated as will be hereinafter described. The index pin 126 is mounted to the bearing block 86 by a right-angled index plate 128 and, further, the index pin 126 is mounted atop an elongated air cylinder 130. The index pin 126 is located within an upright index pin mounting member 132 and rides upon an index pin bushing 134 to facilitate smooth movement therein. As shown in FIGS. 7 and 8, the index pin 126 is positioned immediately adjacent and beneath the index plate 120, and is aligned with the spaced-apart index pin holes 122.

During the application of sealant material 30 to all perimeter edges of the glass sheet 12, the index plate 120 will register successively with each respective pin hole 122 as a result of the consequent rotation of the glass sheet 12. When the index pin 126 is in its retracted state, it rides upon the undersurface of the index plate 120 until the next pin hole 122 is aligned with the index pin 126 whereupon, due to the spring-loading of the index pin 126, the index pin 126 registers with that respective pin hole 122, preventing further rotation of the index plate 120 and the vacuum cup 104 to which the glass sheet 12 is adhered. Thus, the index plate 120, the vacuum cup 104, and the glass sheet 12 are prevented from rotating and are locked into place. The placement of the index pin 126 beneath the index plate 120 and the spacing of the pin holes 122 90° from each other on the perimeter of the index plate 120 assures that a perimeter edge of the glass sheet 12 will be presented to the workman and locked into place preventing further rotation. The index plate 120 and the vacuum cup 104 rotate at 90° increments whereupon the pin holes 122 are axially aligned with the index pin 126.

While the spring-loading of the index pin 126 permits it to immediately project into the pin hole 122 when the pin hole 122 is axially aligned therewith preventing further rotation of the vacuum cup 104 and the index plate 120, the index pin 126 of the present invention requires a retraction means for withdrawing the index pin 126 from the respective pin hole 122 into which it has been inserted so that further rotation of the glass sheet 12 by the workman can occur. Unlocking and retracting the index pin 126 by the retraction means permits the workman to rotate the glass sheet 12 in a 90° increment so that the next perimeter edge of the glass sheet 12 can be presented parallel and adjacent for applying the sealant material 30. The index pin retraction means of the present invention includes an elongated bar switch 136, or "sensi-switch", located adjacent the table application side 38 extending between the two front adjustable table legs resting upon the floor surface. As illustrated in FIGS. 1, 3, 4, 14, and 15, depressing the bar switch 136 closes a switch 137 which energizes a solenoid valve 137A. Shifting of the solenoid valve 137A permits the intake or evacuation of air, further regulated by a flow control valve and a check valve, which actuates a piston within the air cylinder, causing the retraction of the index pin 126. It should, of course, be noted that the use of solenoid valves, flow control valves, check valves, and associated pistons and cylinders are well-known in the art and other means, such as hydraulic means, could also be employed to retract the index pin 126 or to raise and lower the lift shaft 80 and vacuum cup 104. By using a spring-loaded index pin 126, the automatic insertion of the index pin 126 into each respective pin hole 122 is assured as soon as any of the pin holes 122 are axially aligned over the index pin 126, thus eliminating additional circuitry and valving that would be required to raise the index pin 126.

As illustrated in FIGS. 2, 5, 8, and 15, the carriage means includes a sensor 138 mounted to the vacuum cup assembly 66 and aligned with the edge of the index plate 128. The sensor 138 is mounted to the vacuum cup mounting block 86 and can be placed in front of the index plate 120 on the side immediately adjacent the table application side 38 where the workman stands, or the sensor 138 can be mounted on the vacuum cup mounting block 86 behind the vacuum cup 104 and the index plate 120 away from the workman and the table application side 38. The sensor 138 can be any of various proximity sensors, such as an electromagnetic proximity sensor, which are off-the-shelf items widely used in manufacturing. The sensor 138 is adapted to be interactive with the index plate 120 and the notches 124 in order to determine when the index pin 126 is locked into one of the pin holes 122 and the vacuum cup 104 and the index plate 120 are stationary and not rotating, and thus the sheet positioning means (also referred to as the automatic positioning system) is not engageable; and when the index pin 126 is retracted from one of the respective pin holes 122 in the index plate 120 and the vacuum cup 104 and the index plate 120 are rotating, thus engaging the sheet positioning means.

As illustrated in FIG. 15, and as will be described more fully hereinafter, a proximity switch 140 is associated with the sensor 138. When the index pin 126 is locked into one of the pin holes 122 which indicates that a perimeter edge of the glass sheet 12 is presented to the workman, and that the index plate 120 and the vacuum cup 104 are stationary, the proximity switch 140 is in the normally open position. When the workman is done applying sealant material 30 to that particular edge, the workman depresses the bar switch 136 which actuates retraction of the index pin 126 and begins to rotate the glass sheet 12 to have the next edge presented to him for applying sealant material 30 thereto. When the index plate 120 is locked into place by the index pin 126, the sensor 138 is reading off one of the adjacent notches 124 and the associated proximity switch 140 is kept open as shown in FIG. 15. After the index pin 126 is retracted and the workman begins to rotate the glass sheet 12, the sensor 138 is reading off of the edge of the index plate 120, changing the state of the switch 140, and causing the switch 140 to close which indicates that the index plate 120 and the vacuum cup 104 are rotating between 90° increments. The closing of the switch 140 electrically energizes a main relay, designated as CR1 (Control Relay 1) 142 illustrated in FIG. 15. An APR (auto position relay) 210 is also energized and thus the sheet positioning means is now engageable and the workman can automatically position the glass sheet 12 so that the next perimeter edge is presented parallel and adjacent to him for applying the sealant material 30.

Figure 5:
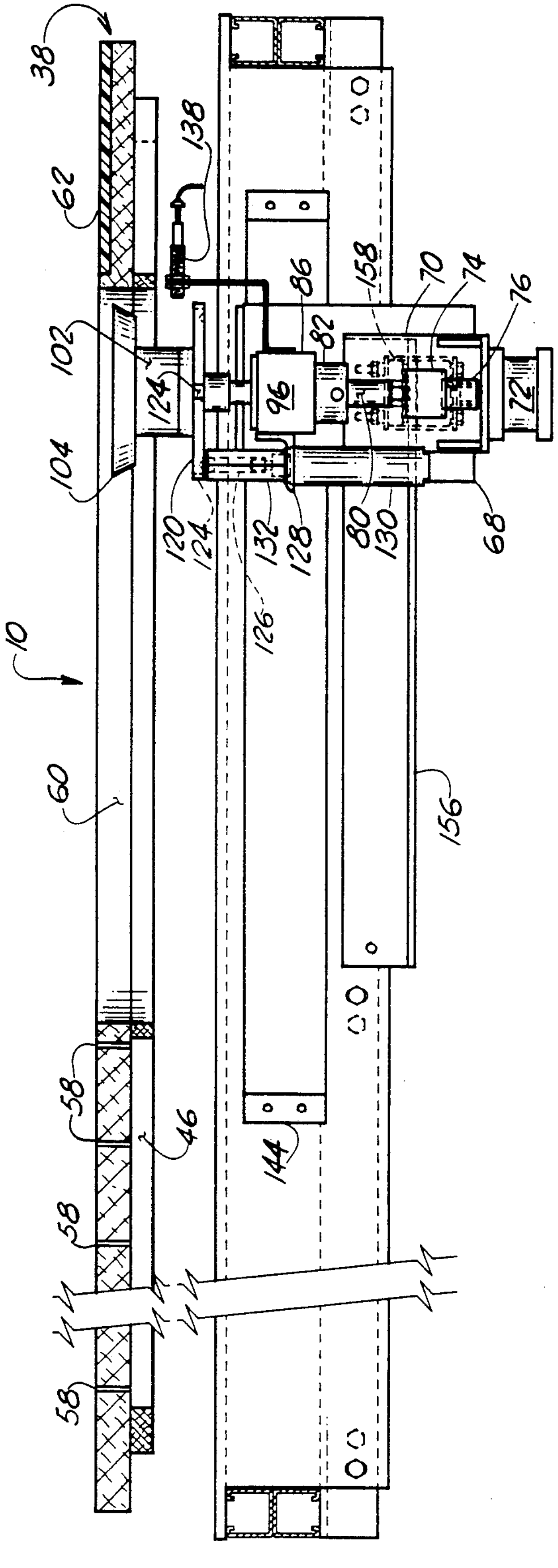
FIG. 5 is a sectional elevational view of the table taken along line 5—5 of FIG. 2.

As shown in FIGS. 1, 4 through 7, 14, and 15, the carriage means includes an air actuated band cylinder 144 secured to a longitudinal table beam 146, as illustrated in FIG. 5. The band cylinder 144 is located beneath the flat work surface 32 and adjacent and parallel to the slot 60. The band cylinder 144 is slightly longer than the slot 60 so that when the vacuum cup assembly 66 is actuated for linear movement, the vacuum cup assembly 66 can travel the full length of the slot 60. More particularly, as shown in FIGS. 6 and 7, the band cylinder 144 is mounted to the longitudinal table beam 146 by a right-angled cylinder mounting angle 148. The structural piece that actually moves the vacuum cup assembly 66 when the sheet positioning means is in operation is a band cylinder carriage 150 which is slidably mounted upon the band cylinder 144 and adapted for linear reciprocal movement either away from or toward the workman, such movement positioning the glass sheet 12 so that a perimeter edge is parallel and adjacent to the workman. Linear movement of the band cylinder carriage 150 is actuated by the band cylinder 144 which interactively responds to output signals generated by detectors (more fully explained hereinafter) and by the sensor 138 and proximity switch 140 interactive with the index plate 120. It should be noted that other types of means for actuating linear movement of the vacuum cup assembly 66 could be utilized, such as a hydraulic means.

As illustrated in FIGS. 14 and 15, which are respectively the pneumatic and the electric diagrams for the assembly table of the present invention, there are two spring-return solenoid valves operatively associated with the band cylinder 144. More specifically, FIG. 14 shows an advance spring-return solenoid valve 152 and a retract spring-return solenoid valve 154. Each solenoid has an associated flow control valve and check valve to regulate the ingress and egress of air to the band cylinder 144 when the band cylinder 144 is actuated for moving the band cylinder carriage 150 and thus positioning the vacuum cup assembly 66 with the vacuum cup 104 adhered to the glass sheet 12 so that an edge of the glass sheet 12 is presented to the workman. The aforementioned spring-return solenoid valves, flow control valves, and check valves are well-known in the art and widely used in numerous mechanical devices.

It should be noted that when the sheet positioning means is engaged and the vacuum cup assembly 66 with the vacuum cup 104 adhered to the glass sheet 12 is moving toward the workman, or is being retracted, then the retract solenoid 154 is actuated and air is going through the advance solenoid, and the band cylinder 144 is actuated to linearly move the carriage 150, and, consequently, the glass sheet 12 adhered to the vacuum cup 104, toward the workman. Likewise, when the vacuum cup assembly 66 with the vacuum cup 104 adhered to the glass sheet 12 is moving away from the workman, or is advancing, then the advance solenoid 152 is actuated and air is actually going through the retract solenoid 154. The directional arrows adjacent the band cylinder 144 in FIG. 14 indicate that when air is going through the advance solenoid 152 then the vacuum cup assembly 66 is being retracted, and vice versa, when air is going through the retract solenoid 154 then the vacuum cup assembly 66 is being advanced.

In order to facilitate the halting or stoppage of the movement of the carriage 150 and the vacuum cup assembly 66 when the index plate 120 has been rotated to the next 90° increment and the index pin 126 has registered into the next respective pin hole 122 thus locking the index plate 120 in place preventing further rotation (this occurring after the workman has rotated the glass sheet 12 so that the next edge is presented to him) the carriage means includes a right-angled braking track 156 located beneath the band cylinder 144 mounted to the cylinder mounting angle 148 and having the same general length as the band cylinder 144 as shown in FIG. 5. Riding upon the braking track 156 and mounted to the vacuum cup assembly 66, more particularly, mounted to the rear of the mounting plate 68, is a brake 158. The assembly table 10 of the present invention utilizes an air-operated caliper brake which is adapted to ride upon the braking track 156. Linear reciprocal movement of the vacuum cup assembly 66 causes the simultaneous movement of the brake 158 on the braking track 156, and the brake 158 traverses the braking track 156 when the carriage 150 is linearly moving. The brake 158 is also selectively actuated for clamping to the braking track 156 when the index pin 126 has registered with one of the pin holes 122 thus facilitating halting of the carriage 150 and linear movement of the vacuum cup assembly 66. FIG. 14 illustrates a spring-return, pilot-operated, brake valve 160 that regulates the ingress and egress of air to the brake 158 and which includes a pneumatic switch 162 which is the pilot actuator. The brake valve 160 is operatively associated with the advance solenoid 152 and the retract solenoid 154 via a pneumatic control shuttle valve 164. It should be noted that pressurized air is supplied to all of the structural elements illustrated in FIG. 14 by an air supply means (not shown) which is further regulated through a filter 166 and a pressure regulator 168 for maintaining pressure in the line at generally between 45 psi minimum and 85 psi maximum.

As illustrated in FIGS. 1, 2, 9, 12, 13, and 15, the sheet detecting means includes a plurality of spaced-apart detectors 170 located in the table 10 between the slot 60 and the table application side 38. More specifically, the preferred embodiment of the assembly table 10 includes four spaced-apart detectors 170 arrayed on the left-hand side of the slot 60, due to the fact that the assembly table 10 is designed for counterclockwise rotation of the glass sheet 12 and also due to the fact that the hand applicator 16 specifically used is designed for right-handed use. If a left-handed individual utilized a left-handed applicator to apply the sealant material 30 to the perimeter edges of the glass sheet 12, the detectors 170 would be on the right-hand side of the slot 60 and the glass sheet 12 would be rotated clockwise in order to interact with the detectors 170. The detectors 170 are part of the sheet positioning means.

Figure 9:
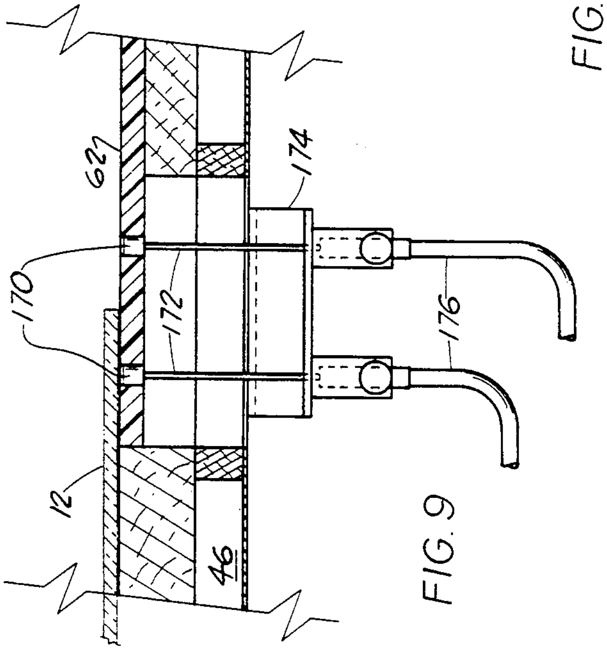
FIG. 9 is an enlarged cross-sectioned elevational view of the table taken along line 8—8 of FIG. 2.

A number of different limit and proximity switches well-known in the art may be employed for activation by the glass sheet 12. In the assembly table 10, the detectors 170 are detectors (fiber optic photocells) which are activated or deactivated in response to the glass sheet 12 passing over them as the glass sheet 12 is rotated. As shown in FIG. 9, the fiber optic wire 172 for the detectors 170 extends up through the table 10 to the flat work surface 32. Each cable terminates at a covering or lens plate placed within the flat surface. A detector mounting bracket 174 secures a flexible cable 176 in which each fiber optic wire 172 runs to the underside of the table 10 and a pair of thumbscrews adjusts the distance the fiber optic wire 172 is from the covering or permits removal of the conductor from the mounting bracket 174.

Figure 12:
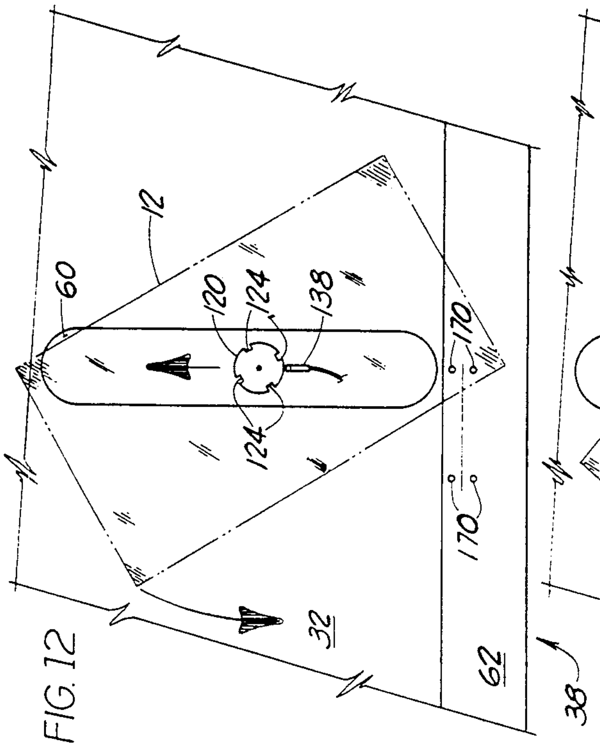
FIG. 12 is a top plan view of the table first shown in FIG. 1, illustrating sheet material rotation on the flat work surface.
Figure 13:
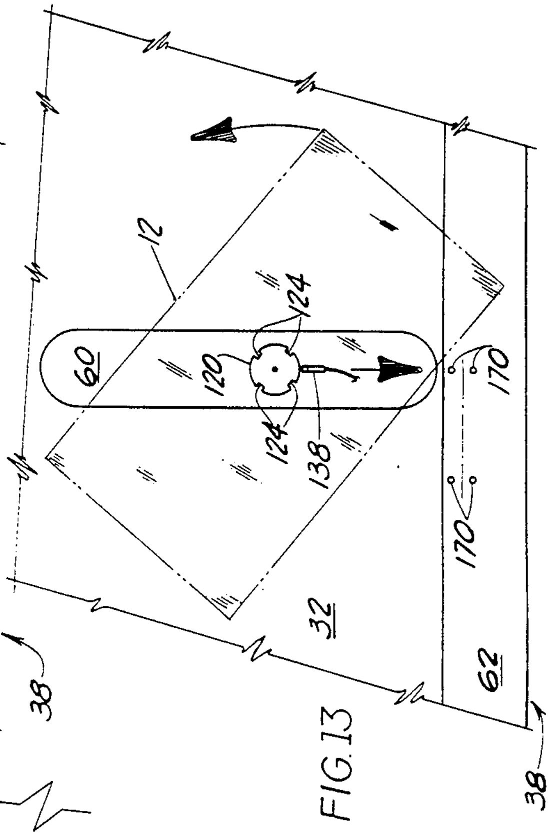
FIG. 13 is a top plan view of the table first shown in FIG. 12, illustrating sheet material rotation to a different position than the position illustrated in FIG. 12.

Photodetector switches 178 are mounted beneath the table 10 and change state as a result of the activation or deactivation of the glass sheet 12 passing over them; generally speaking, as will be more fully explained hereinafter, each detector 170 has an associated switch 178 and relays 180 (contacts), and when there is no glass sheet 12 over the detectors 170, the associated switch 178 is in what would be called an "open" state or condition. Thus, the detectors 170 are in a deactivated state. The glass sheet 12, as shown in FIGS. 12 and 13, passing over each respective detector 170 causes a change in their state or condition and the glass sheet 12 activates each respective detector 170 that it passes over as it is being rotated by the workman. This activation causes the associated switch 178 to close (or to open) thus electrifying an associated relay 180. The glass sheet 12 passing over each respective detector 170 causes that detector 170 to be activated and, as a consequence, produces an output signal which actuates reciprocal linear movement of the vacuum cup assembly 66 as will be more fully described hereinafter. FIG. 9 illustrates one advance detector 170 on the left-hand side and one retract detector 170 on the right-hand side.

The assembly table 10 of the present invention employs four detectors 170 which can be divided into a pair of in-line retract detectors parallel to each other and adjacent the workman as he is standing at the table application side 38. Inboard of the spaced-apart retract detectors are a pair of parallel, in-line advance detectors adjacent the slot 60. FIGS. 1 and 2 show the table 10 in what may be called its "initial" position whereby the glass sheet 12 has a perimeter edge parallel and adjacent to the workman and covering both advance detectors 170 while not covering both in-line retract detectors 170. The glass sheet 12 is adhered to the vacuum cup 104 and is centered upon the flat work surface 32. For clarity and simplicity, FIG. 15 shows only one retract detector and one advance detector, although FIGS. 1, 2, 12, and 13 illustrate four detectors 170 positioned on the flat work surface 32. The relay 180, denoted as PC1, is associated with the switch 178 for the advance detector and the relay 180, denoted as PC2, is associated with the switch 178 for the retract detector.

The flat work surface 32 of the assembly table 10, as shown in FIG. 1, reveals the plurality of spaced-apart air holes 58 through which the pressurized air is emitted in order to float the glass sheet 12 slightly above the flat work surface 32. The glass sheet 12 is brought to the assembly table 10 from a separate work station, and the glass sheet 12 is carefully placed upon the flat work surface 32 whereupon pressurized air generated from the blower 48, as shown in FIGS. 3 and 4, is distributed throughout the air chamber 46 and emitted through the air holes 58 thereby floating the glass sheet 12 slightly above the flat work surface 32 so that the workman can carefully center and position the glass sheet 12 over the vacuum cup 104 so that vacuum cup suction adherence can be initiated.

As can be seen in FIGS. 1 and 2, the detectors 170 are not in the area of the spaced air holes 58 but are positioned in, and the fiber optic wire 172 projects up through, the area of the flat work surface 32 comprising the wear strip 62.

Figure 10:
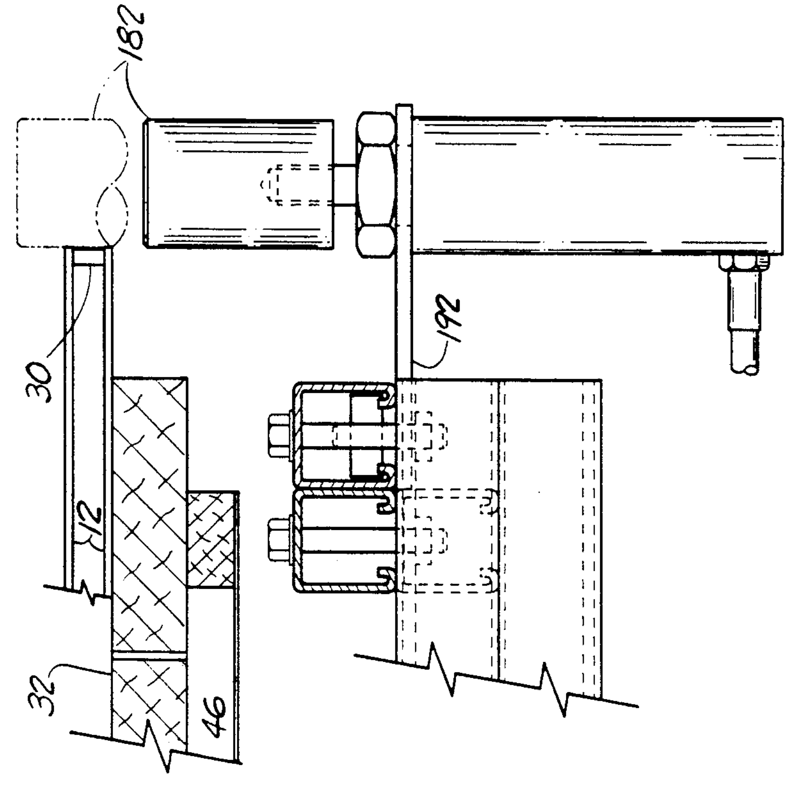
FIG. 10 is a sectional elevational view of the table taken along line 9—9 of FIG. 2.

Another feature of the assembly table 10 which is illustrated in FIGS. 1 through 3, 10, 11, and 14, are a plurality of spaced-apart, selectively actuated, retractable, pop-up squaring pins 182 mounted at the side of the assembly table 10 adjacent the table application side 38. In the assembly table 10, two squaring pins 182 are located immediately adjacent to the workman on the table application side 38 and a third squaring pin 182 is mounted to the side of the table 10 diagonally to the two aforementioned squaring pins 182. When disposed in their operative position, the squaring pins 182 project above the flat work surface 32 as is shown in FIG. 10. The means to selectively actuate the retraction and extension of the squaring pins 182 when squaring of glass sheets is desired is through a throttle valve 184, for example, mounted adjacent the table application side 38 and within easy reach by the workman standing at the front of the table 10. The squaring pins 182 are air actuated, thus, pushing in or pulling out the throttle valve 184, as illustrated in FIG. 14, permits the inflow or egress of air to each respective cylinder 186 of each squaring pin 182. A squaring pin flow control valve 188 and a squaring pin check valve 190 regulates the ingress and egress of air to the cylinders 186 of each respective squaring pin 182 as shown in FIG. 14.

In addition, as illustrated in FIG. 11, the squaring pins 182 can be adjustably and longitudinally moved and positioned along the side of the table 10. This longitudinal adjustment of each squaring pin 182 is necessary in order to accommodate glass sheets of various sizes. As illustrated in FIGS. 1, 10, and 11, each respective squaring pin 182 is mounted to the table 10 by a flat mounting plate 192. The mounting plate 192 is further secured to the table 10 by a unistrut member which allows longitudinal selective adjustment of the squaring pins 182 and is shown most clearly in FIG. 10. FIG. 11 illustrates the directions in which the squaring pins 182 can be moved.

The purpose of the squaring pins 182 will now be described. After the workman has applied sealant material 30 to all the perimeter edges of the glass sheet 12, the vacuum cup 104 is released from suction adherence to the glass sheet 12 while at the same time the blower 48 is still supplying pressurized air to the air chamber 46 and the pressurized air is being emitted through the air holes 58 to impart and maintain floating action to the glass sheet 12. It should be noted as a safety precaution that the squaring pins 182 cannot be selectively actuated for extension to their operative position while the glass sheet 12 is still adhered to the vacuum cup 104. The reason is that if the squaring pins 182 are allowed to project into their operative position while the vacuum cup 104 is still adhered to the glass sheet 12, the workman may accidentally rotate the glass sheet and quite possibly, depending upon the size of the glass sheet, could cause the glass sheet to strike the squaring pins 182, not only damaging the glass sheet but possibly causing serious injury to the workman.

With the sealant material 30 applied to the edges of the glass sheet 12, the workman directs or floats the glass sheet 12 to the area adjacent the squaring pins 182, then, by pushing the throttle valve 184, raises the squaring pins 182 so that they pop up to their operative position. With the squaring pins 182 in their operative position and the blower 48 still supplying air to the table 10, the glass sheet 12 is floated to the pins 182 so that the glass sheet 12 is positioned contiguously against all the squaring pins 182 as shown in FIG. 11.

With the glass sheet 12 butted against the squaring pins 182, and properly aligned therewith, the workman activates an air block means to cut off and prevent pressurized air from reaching the air chamber 46. The air block means thus cuts off the air flotation so that the glass sheet 12 cannot float above the flat work surface 32; when the air block means is actuated, the glass sheet 12 consequently rests directly on the flat work surface 32. The air block means may be a plate 194, screen, or baffle, as illustrated in FIG. 14, located within the blower 48 adjacent the blower outlet 56. Actuation of the plate 194 will block air from reaching the air chamber 46, thus taking away the ability to float the glass sheet 12 above the flat work surface 32. The control for actuating the plate 194 is located adjacent the table application side 38 and within easy reach by the workman and, as illustrated in FIG. 1, the control is placed right beside the valve 184 for actuating retraction and extension of the squaring pins 182. Several push/pull-type controls, switches, knobs, or buttons can be utilized; a push/pull chop or throttle valve 196 is used in the present invention.

As shown in FIG. 14, the valve 196 is simply pushed to vent, blocking and deactivating the air flotation and pulled to maintain the air flotation. A pair of air block check valves 198 and a pair of flow control valves 200 regulate the air actuation of a piston which moves the plate 194 for venting or maintaining the float.

With the air flotation temporarily impeded and shut off by the air block means and the glass sheet 12 properly positioned contiguous to the squaring pins 182, both hands of the workman are now free to place upon the glass sheet 12 vertical and/or horizontal support members 202, such as mullion and muntin strips, and then the workman can make what is in the industry called the "sandwich". The grid lines 64 are used to properly position the support members 202; a typical layout for the grid lines 64 is to array them in one-inch squares. With both hands free, the workman can then place a second glass sheet (not shown) directly on top of and align it with the support member 202 and the lower glass sheet 12 - thus the term "sandwich". The squaring pins 182 are maintained in their operative position so that the lower glass sheet 12 stays aligned and in place while the workman is placing the vertical and/or horizontal member 202 thereupon, and also for making the sandwich by placing the second glass sheet upon the support member 202 and aligning the second glass sheet with the already properly aligned lower glass sheet 12. Normally, in the process of making the sandwich, the second glass sheet is placed atop the lower glass sheet 12 at another work station, but with the assembly table 10 of the present invention, the sandwich can be made without having to move to another work station due to the use of the pop-up squaring pins 182 and the air block means. These elements enhance the usefulness of the assembly table 10 of the present invention and also increase worker efficiency and the production of glass sheets. The assembly table 10 of the present invention may be considered an all-in-one table due to the utilization of such features as the squaring pins 182 and the air block means.

As shown in FIGS. 1, 3, 4, and 15, an electrical control box 204 and a control panel 206 is mounted to the table 10 at the table application side 38 and within easy reach of the workman standing at the right-hand side of the assembly table 10. The control panel 206 includes three control buttons or knobs shown in FIG. 15: a pushbutton light, an emergency all-stop button which will electrically deactivate the sheet positioning means and the carriage means, and the electrical signaling and interactions that occur therebetween when the workman is positioning and rotating the glass sheet for applying the swiggle strip to the perimeter edges. The pushbutton **208*a* is a spring-loaded, normally open, manual switch providing power to relay, and its light 208*b* monitors the on/off condition of a relay referred to as the automatic positioning relay 210. The third control displayed on the control panel is a normally open manual selector switch 212 used to center and position the glass sheet 12 upon the flat work surface 32 of the table 10. In order to position the glass sheet 12 to the initial or start position as illustrated in FIG. 1, the workman may have to bring the glass sheet 12 in or move the glass sheet 12 toward the center of the table 10, depending on the size of the glass sheet so that the initial position of having the glass sheet 12 covering the advance detectors 170 and leaving the retract detectors 170** uncovered is achieved.

In the assembly table 10 of the present invention, the manual selector switch 212 is a three-position spring return to center switch. The manual selector switch 212 actuates the band cylinder 14 to cause linear movement of the carriage 150 in order to properly center and position the vacuum cup assembly 66 with the vacuum cup 104 adhered to the glass sheet 12 above the flat work surface 32. The manual selector switch 212, denoted as "ss2" on FIG. 15, functions independently of the sheet positioning means.

Referring to FIGS. 12 through 15, the glass sheet 12 will be in an initial or starting position (shown in FIGS. 1 and 2) with the glass sheet 12 covering the advance detectors 170 and leaving the retract detectors 170 uncovered, with the vacuum cup 104 adhered to the glass sheet 12 and one of the perimeter edges of the glass sheet 12 positioned between the advance and retract detectors 170 adjacent the workman 14. The pushbutton **208*a* is pressed on and the APR (auto position relay) 210 is energized and maintains electrical power by the APR 210** closing the APR contact.

The index pin 126 is extended into one of the pin holes 122, preventing rotation of the lift shaft 80, the index plate 120, the vacuum cup 104, and glass sheet 12. The sensor 138 is interfaced and aligned with one of the notches 124, maintaining the normally open condition of the proximity switch 140 and the CR1 142 is also unenergized (the CR1 contacts are as shown in FIG. 15). The vacuum cup assembly 66 is stationary within the slot 60, and the workman 14 can apply sealant material 30 to the glass sheet edge facing him. Finally, the sheet positioning means has not been engaged.

To arrive at the next perimeter edge, the workman retracts the index pin 126 by depressing the bar switch 136. The workman starts to rotate the glass sheet 12 counterclockwise, causing the index plate 120 to rotate. Rotation of the index plate 120 causes the sensor 138 to change state; the sensor 138 is activated by its proximity to the edge of the plate 120. This causes the proximity switch 140 to close which energizes the CR1 142, and the CR1 contacts go into an opposite state as shown in FIG. 15. The sheet positioning means is now engaged and linear movement of the vacuum cup assembly 66 is now possible.

As shown in FIG. 12, rotation of the glass sheet 12 initially causes one advance detector 170 and one retract detector 170 to be covered. Because the retract detector 170 is now covered, while maintaining coverage of the advance detector 170, linear movement of the vacuum cup assembly 66 and the glass sheet 12, away from the workman, is activated. The PC1 relay 180 is energized (from the initial starting position) and the PC2 relay 180 is energized because the glass sheet 12 has, by covering, activated the retract detector 170. The CR1 contact of CR2 142 has now changed its state, thus overriding and nullifying the manual selector switch 212.

As shown in FIG. 15, the solenoids 152 and 154 are controlled by the PC1 and PC2 contacts within their circuits, thus automatically controlling movement of the glass sheet 12 to or away from the workman 14. The advance solenoid 152 is actuated, unlocking the brake 158 and porting air to the atmosphere. Air moves through the retract solenoid 154, thus actuating the band cylinder 144 to advance away from the workman. This causes the carriage 150 and the vacuum cup assembly 66, as well as the glass sheet 12 adhered thereto, to advance away from the workman.

As the workman continues rotation of the glass sheet 12, FIG. 13 shows the next position of the glass sheet 12. The sheet positioning means is still engaged because the index plate 120 is rotating and the sensor 138 is still interactive with the edge of the index plate 120. The linear movement of the carriage 150 and vacuum cup assembly 66 has now caused the glass sheet 12 to uncover all the detectors 170, both advance and retract. The switches 178 for the detectors 170 are open and PC1 180 and PC1 180 relays are unenergized.

Following FIG. 15, the retract solenoid 154 is energized, thus porting air through the advance solenoid 152 and actuating the band cylinder 144 to cause the glass sheet 12 to retract toward the workman. The workman is still rotating the sheet 12 while the sheet 12 is being simultaneously retracted. Finally, rotation of the glass sheet 12 causes the next pin hole 122 to align with the index pin 126, and the pin 126 is extended therein, thus locking the plate 120 and preventing rotation of the lift shaft 80, the vacuum cup assembly 66, and the glass sheet 12.

The index plate 120 is locked into place and the next perimeter edge of the glass sheet 12 is presented to the workman for applying sealant material 30 thereto. The sheet 12 is now in the position as shown in FIGS. 1 and 2. The sensor 138 is now aligned with the notch 124, closing the proximity switch 140 and de-energizing CR1 142; thus the sheet positioning means is not engageable while the immediately aforedescribed conditions hold. This entire operational procedure is repeated until the workman has applied sealant material 30 to all the perimeter edges of the glass sheet 12.

While a preferred embodiment of the present invention has been described and illustrated, it is apparent that numerous additions and alterations may be made without departing from the spirit thereof.

We claim:

1. An air flotation assembly table for presenting successive edges of flat sheet material to a workman, the assembly table having a flat work surface upon which the sheet material can be floated and positioned, a longitudinal slot formed on the flat work surface, a plurality of air holes extending through the work surface, and a blower means for supplying air to impart selective floating action to the sheet material comprising:

- a carriage means for imparting linear reciprocal movement to the sheet material;
- the carriage means including:
  - a band cylinder positioned beneath the flat work surface and adjacent the slot;
  - a band cylinder carriage slidably mounted upon the band cylinder for linear reciprocal movement within the longitudinal slot, the band cylinder carriage actuated for linear movement by the band cylinder;
- a lifting means for positioning the sheet material on the flat work surface and moving the sheet material to or away from the flat work surface, the lifting means including:
  - a selectively rotatable lift shaft mounted to the band cylinder carriage and positioned within the longitudinal slot, the lift shaft adapted for slidable upward movement toward the sheet material and downward movement away from the sheet material;
- a sheet adherence means for adhering to the sheet material disposed on the flat work surface, the sheet adherence means including:
  - a rotatable vacuum cup mounted upon the lift shaft and adapted for selective suction adherence to the sheet material;
- a sheet detecting means interactive with the carriage means for actuating the carriage means in order to position and continuously present successive edges of the sheet material to the workman, the sheet detecting means including:
  - a pair of advance detectors mounted within the work surface adjacent the slot and aligned with each other, the advance detectors actuating linear movement of the band cylinder carriage and the vacuum cup toward the workman when rotation of the sheet material uncovers and activates the advance detectors as the sheet material is being positioned on the table; and
  - a pair of in-line retract detectors mounted in the flat work surface parallel with, and located in front of, the advance detectors, the retract detectors actuating linear movement of the band cylinder carriage and the vacuum cup away from the workman when rotation of the sheet material activates the retract detectors.

2. The assembly table of claim 1 further comprising a vacuum cup assembly mounted to the band cylinder carriage and located within the slot, the vacuum cup assembly supporting a portion of the lift shaft and moving in tandem with the linear reciprocal movement of the band cylinder carriage.

3. The assembly table of claim 1 further comprising a circular index plate mounted to the lift shaft subjacent the vacuum cup and having substantially the same diameter as the vacuum cup, the index plate adapted to rotate simultaneously with the lift shaft and the vacuum cup for positioning sheet material above the flat work surface.

4. The assembly table of claim 3 wherein the index plate is characterized by having a plurality of index pin holes equidistantly spaced one from the other adjacent the edge of the plate.

5. The assembly table of claim 4 further comprising a selectively-retractable, spring-loaded index pin parallel to and offset from the lift shaft, the index pin positioned immediately beneath the index plate for registering with each pin hole as a result of the rotation of the index plate.

6. The assembly table of claim 3 wherein the index plate includes a plurality of outwardly-open notches located on the edge of the plate, each notch equidistantly spaced one from the other and located adjacent a respective pin hole.

7. The assembly table of claim 1 further comprising a sensor mounted to the vacuum cup assembly aligned with and spaced from the edge of the index plate, the sensor interactive with the index plate and the notches in order to determine when the index pin is locked into one of the pin holes and the index plate is stationary, and when the index pin is retracted therefrom and the index plate is rotating.

8. The assembly table of claim 7 wherein the sensor is interactive with the index plate to generate output signals to the carriage means to initiate reciprocal linear movement of the vacuum cup assembly for rotating and positioning the sheet material on the table.

9. The assembly table of claim 1 wherein the retract and advance detectors are interactive with and generate output signals to the carriage means for actuating linear reciprocal movement of the band cylinder carriage and the vacuum cup assembly.

10. The assembly table of claim 1 wherein the carriage means includes a braking track mounted to a longitudinal table beam extending beneath the flat work surface, the braking track mounted beneath the band cylinder carriage and having generally the same length as the band cylinder carriage.

11. The assembly table of claim 10 further comprising a brake mounted to the vacuum cup assembly and adapted for linear reciprocal movement simultaneously therewith, the brake adapted to traverse the braking track in order to facilitate halting of the linear movement of the band cylinder carriage.

12. The assembly table of claim 1 further comprising a plurality of spaced-apart, retractable squaring pins mounted at the edge of the table and extending above the flat work surface when disposed in their operative position, the squaring pins permitting the sheet material to be contiguously positioned thereagainst for squaring the sheet material so that further sheet material can be placed thereupon and in alignment therewith.

13. The assembly table of claim 12 further comprising a means for selectively actuating the retraction and extension of the squaring pins when squaring of sheet material is desired.

14. The assembly table of claim 1 further comprising grid lines placed upon the flat work surface for facilitating alignment and placement of a support member on the sheet material that has been squared against the squaring pins, and for centering and positioning the sheet material on the sheet adherence means.

15. The assembly table of claim 1 further comprising air block means to cut off and prevent pressurized air generated by the blower means from floating the sheet material, the air block means thus preventing pressurized air from being emitted through the air holes so that the sheet material cannot float above the flat work surface,

16. The assembly table of claim 1 further comprising means for electrically deactivating the carriage means and the sheet detecting means so that movement of the sheet material on the flat work surface is halted.

* * * * *